(12) United States Patent
Seo et al.

(10) Patent No.: US 11,806,801 B2
(45) Date of Patent: Nov. 7, 2023

(54) JOINING METHOD

(71) Applicant: NIPPON LIGHT METAL COMPANY, LTD., Tokyo (JP)

(72) Inventors: Nobushiro Seo, Shizuoka (JP); Hisashi Hori, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/158,981

(22) Filed: Jan. 24, 2023

(65) Prior Publication Data

US 2023/0158599 A1    May 25, 2023

Related U.S. Application Data

(62) Division of application No. 16/485,007, filed as application No. PCT/JP2017/036929 on Oct. 12, 2017, now Pat. No. 11,590,605.

(30) Foreign Application Priority Data

May 11, 2017    (JP) ................................. 2017-095048

(51) Int. Cl.
*B23K 20/00* (2006.01)
*B23K 20/12* (2006.01)

(52) U.S. Cl.
CPC ............................... *B23K 20/1255* (2013.01)

(58) Field of Classification Search
CPC .................. B23K 20/122; B23K 20/1255; B23K 20/126; B23K 20/1265; B23K 2101/18; B23K 37/0235; B23K 37/0408
See application file for complete search history.

(56) References Cited

U.S. PATENT DOCUMENTS

| 6,994,242 B2 * | 2/2006 | Fuller ................ B23K 20/1255 228/112.1 |
| 7,942,306 B2 | 5/2011 | Burford |

(Continued)

FOREIGN PATENT DOCUMENTS

| JP | H11-267859 A | 10/1999 |
| JP | 2007-160370 A | 6/2007 |

(Continued)

OTHER PUBLICATIONS

Office Action for Chinese Patent Application No. 201780086021.1 dated Nov. 23, 2020.

(Continued)

*Primary Examiner* — Erin B Saad

(74) *Attorney, Agent, or Firm* — Merchant & Gould P.C.

(57) ABSTRACT

Provided is a joining method that can prevent a plastic flowing material from flowing out from a butt section and that can reduce the thickness and weight of metal members. The joining method is for joining a first metal member and a second metal member by using a rotary tool comprising a stirring pin, and is characterized in that: the stirring pin comprises a flat surface perpendicular to the rotation axis of the rotary tool and comprises a protruding section protruding from the flat face; and in a friction stirring step, the flat surface is brought into contact with the first metal member and the second metal member, and a front end face of the protruding section is inserted deeper than an upper overlapping section to join an upper front butt section and the upper overlapping section.

1 Claim, 14 Drawing Sheets

(56) References Cited

U.S. PATENT DOCUMENTS

| | | |
|---|---|---|
| 8,016,179 B2 | 9/2011 | Burford |
| 2003/0056368 A1 | 3/2003 | Nyqvist |
| 2005/0121497 A1 | 6/2005 | Fuller et al. |
| 2009/0072007 A1* | 3/2009 | Nagano ............... B23K 20/1255 228/2.1 |
| 2010/0282822 A1 | 11/2010 | Nagano |
| 2013/0175019 A1* | 7/2013 | Phelan ................ F28D 15/0275 29/890.032 |
| 2015/0273637 A1* | 10/2015 | Hori ..................... B23K 20/122 29/890.03 |
| 2016/0167161 A1* | 6/2016 | Sato ..................... B23K 20/122 228/114.5 |
| 2017/0050263 A1* | 2/2017 | Wu ..................... B23K 20/1265 |
| 2018/0250767 A1 | 9/2018 | Hori et al. |
| 2019/0366474 A1 | 12/2019 | Ikeda et al. |

FOREIGN PATENT DOCUMENTS

| | | |
|---|---|---|
| JP | 2008-279513 A | 11/2008 |
| JP | 2009-172682 A | 8/2009 |
| WO | 2007/119343 A1 | 10/2007 |
| WO | 2017/033923 A1 | 3/2017 |

OTHER PUBLICATIONS

Office Action for Chinese Patent Application No. 201780086021.1 dated Jul. 14, 2021.
International Search Report from International Application No. PCT/JP2017/036929 dated Dec. 19, 2017 (4 pages).
International Written Opinion from International Application No. PCT/JP2017/036929 dated Dec. 19, 2017 (5 pages).

* cited by examiner

JOINING METHOD

This application is a Divisional of U.S. patent application Ser. No. 16/485,007, filed 9 Aug. 2019, which is a National Stage Application of PCT/JP2017/036929, filed 12 Oct. 2017, which claims benefit of Serial No. 2017-095048, filed 11 May 2017 in Japan and which application(s) are incorporated herein by reference. To the extent appropriate, a claim of priority is made to each of the above disclosed applications.

TECHNICAL FIELD

The present invention relates to a joining method.

BACKGROUND ART

There is a technique known as welding a pair of double-skin panels by friction stir (Patent Literature 1). FIG. 14 is a cross-sectional diagram illustrating a butting step in a conventional joining method. FIG. 15 is a cross-sectional diagram illustrating a friction stirring step in the conventional joining method. As illustrated in FIG. 14, in the butting step in the conventional joining method, an end portion of a first metal member 101 and an end portion of a second metal member 102 are butted together. Notches are respectively formed in the end portions of the first and second metal members 101, 102. When the end portions of the first and second metal members 101, 102 are butted together, a butt section J10 shaped like a crank in a cross-sectional view is formed therebetween.

In the friction stirring step illustrated in FIG. 15, a friction-stir welding is performed using a rotary tool G which includes a shoulder section G1 and a stirring pin G2. A plasticized area W10 is formed along a track of movement of the rotary tool G. In this process, the rotary tool G is relatively moved along the butt section J10 with a lower end surface of the shoulder section G1 pressed into the surfaces of the respective first and second metal members 101, 102 by several millimeters. The forming of the butt section J10 in the crank shape in the cross-sectional view like this makes it possible to prevent misalignment of the first and second metal members 101, 102.

CITATION LIST

Patent Literature

Patent Literature 1: Japanese Patent Application Publication No. 2008-279513

SUMMARY OF INVENTION

Technical Problem

In the conventional joining method, however, the shoulder section G1 is pressed into the surfaces of the first and second metal members 101, 102, and thereby applies large load onto the first and second metal members 101, 102, which involves a risk that a plastic fluid material may flow out of the butt section J10 into a hollow section Z via the lower end of the butt section J10. In addition, since the shoulder section G1 is pressed into the surfaces of the first and second metal members 101, 102, the plate thickness of a prop 102a of the second metal member 102 needs to be large enough to withstand the pressing load from the rotary tool G.

From this viewpoint, an object of the present invention is to provide a joining method which is capable of: preventing the flow of the plastic fluid material out of the butt sections; and reducing the thicknesses and weights of the metal members.

Solution to Problem

To solve the above problem, the present invention is a joining method of welding a first metal member and a second metal member using a rotary tool with a stirring pin. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the front-side butt section and the lap section by inserting the stirring pin, as rotating, from the front-side butt section, and by relatively moving the rotary tool along the front-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the front-side butt section and the lap section are welded with the flat surface put in contact with the first metal member and the second metal member, and with a distal end surface of the protruding section inserted deep beyond the lap section.

The present invention is a joining method of welding a first metal member and a second metal member using a rotary tool with a stirring pin. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the back-side butt section and the lap section by inserting the stirring pin, as rotating, from the back-side butt section, and by relatively moving the rotary tool along the back-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the back-side butt section and the lap section are welded with the flat surface put in contact with the first metal member and the second metal member, and with a distal end surface of the protruding section inserted deep beyond the lap section.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the front-side butt section and the lap section by inserting the stirring pin, as rotating, from the front-side butt section, and by relatively moving the rotary tool along the front-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the front-side butt section and the lap section are welded with the flat surface put in contact with the first metal member and the second metal member, and with a distal end surface of the protruding section inserted deep beyond the lap section.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the back-side butt section and the lap section by inserting the stirring pin, as rotating, from the back-side butt section, and by relatively moving the rotary tool along the back-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the back-side butt section and the lap section are welded with the flat surface put in contact with the first metal member and the second metal member, and with a distal end surface of the protruding section inserted deep beyond the lap section.

Since each above joining method performs the fiction stir with only the stirring pin in contact with the first and second metal members, the joining method is capable of: reducing load on the first and second metal members; and preventing the flow of the plastic fluid material out of the butt sections. In addition, because of the reduction in the load on the first and second metal members, the joining method is capable of reducing the thicknesses and weights of the respective first and second metal members. Furthermore, because of the deep insertion of the distal end surface of the protruding section beyond the lap section, the joining method is capable of securely joining portions around the lap section. Moreover, since the rotary tool includes the flat surface, the joining method is capable of: inhibiting the plastic fluid material from stirring up around the protruding section; and thereby securely shattering an oxide film of the lap section.

The present invention is a joining method of welding a first metal member and a second metal member using a rotary tool with a stirring pin. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the front-side butt section by inserting the stirring pin, as rotating, from the front-side butt section, and by relatively moving the rotary tool along the front-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the front-side butt section is welded with both the flat surface and a distal end surface of the protruding section put in contact with the first metal member and the second metal member.

The present invention is a joining method of welding a first metal member and a second metal member using a rotary tool with a stirring pin. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the back-side butt section by inserting the stirring pin, as rotating, from the back-side butt section, and by relatively moving the rotary tool along the back-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the back-side butt section is welded with both the flat surface and a distal end surface of the protruding section put in contact with the first metal member and the second metal member.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the front-side butt section by inserting the stirring pin, as rotating, from the front-side butt section, and by relatively moving the rotary tool along the front-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the front-side butt section is welded with both the flat surface and a distal end surface of the protruding section put in contact with the first metal member and the second metal member.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the back-side butt section by inserting the stirring pin, as rotating, from the back-side butt section, and by relatively moving the rotary tool along the back-side butt section with only the stirring pin put in contact with the first metal member and the second metal member, in which the stirring pin includes a flat surface vertical to an axis of rotation of the rotary tool, and a protruding section projecting from the flat surface, and in the friction stirring step, the back-side butt section is welded with both the flat surface and a distal end surface of the protruding section put in contact with the first metal member and the second metal member.

Since each above joining method performs the friction stir with only the stirring pin in contact with the first and second metal members, the joining method is capable of reducing the load on the first and second metal members, and to prevent the flow of the plastic fluid material out of the butt sections. In addition, since the joining method performs the friction stir with only the stirring pin in contact with the first and second metal members, the joining method is capable of reducing the thicknesses and weights of the respective first and second metal members.

The present invention is a joining method of welding a first metal member and a second metal member using a rotary tool with a stirring pin. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the front-side butt section by inserting the stirring pin, as rotating, from the front-side butt section, and by relatively moving the rotary tool along the front-side butt section with only the stirring pin put in contact with the first metal member and the second metal member.

The present invention is a joining method of welding a first metal member and a second metal member using a rotary tool with a stirring pin. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the back-side butt section by inserting the stirring pin, as rotating, from the back-side butt section, and by relatively moving the rotary tool along the back-side butt section with only the stirring pin put in contact with the first metal member and the second metal member.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the front-side butt section by inserting the stirring pin, as rotating, from the front-side butt section, and by relatively moving the rotary tool along the front-side butt section with only the stirring pin put in contact with the first metal member and the second metal member.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method includes: a preparation step of forming a first step bottom surface and a first step side surface in a front surface of an end portion of the first metal member, and forming a second step bottom surface and a second step side surface in a back surface of an end portion of the second metal member; a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and a friction stirring step of welding the back-side butt section by inserting the stirring pin, as rotating, from the back-side butt section, and by relatively moving the rotary tool along the back-side butt section with only the stirring pin put in contact with the first metal member and the second metal member.

Since each above joining method performs the friction stir with only the stirring pin in contact with the first and second metal members, the joining method is capable of reducing the load on the first and second metal members, and to prevent the flow of the plastic fluid material out of the butt sections. In addition, since the joining method performs the friction stir with only the stirring pin in contact with the first and second metal members, the joining method is capable of reducing the thicknesses and weights of the respective first and second metal members.

Furthermore, it is preferable that: in the friction stirring step, a flat surface formed in a distal end of the stirring pin is inserted deep beyond the lap section.

Each above joining method is capable of securely joining portions around the lap section.

The present invention is a joining method of welding a first metal member and a second metal member using a rotary tool with a stirring pin. The joining method includes: a superposition step of forming a lap section by superposing a back surface of the second metal member onto a front surface of the first metal member; and a friction stirring step of welding the lap section by inserting the stirring pin, as rotating, from a front surface of the second metal member, and by relatively moving the rotary tool along the lap section with only the stirring pin put in contact with the first metal member and the second metal member, in which the stirring pin includes a flat surface vertical to an axis of rotation of the rotary tool, and a protruding section projecting from the flat surface, and in the friction stirring step, the lap section is welded with the flat surface put in contact with the second metal member, and with a distal end surface of the protruding section put in contact with the first metal member.

The present invention is a joining method of welding a first metal member and a second metal member using a rotary tool with a stirring pin, the first metal member and the second metal member each being a double-skin panel mainly including an upper base plate, a lower base plate, and a support plate connecting the upper base plate and the lower base plate. The joining method comprising: a superposition step of forming a lap section by superposing a back surface of the second metal member onto a front surface of the first metal member; and a friction stirring step of welding the lap section by inserting the stirring pin, as rotating, from a front surface of the second metal member, and by relatively moving the rotary tool along the lap section with only the stirring pin put in contact with the first metal member and the second metal member, in which the stirring pin includes a flat surface vertical to an axis of rotation of the rotary tool, and a protruding section projecting from the flat surface, and in the friction stirring step, the lap section is welded with the flat surface put in contact with the second metal member, and with a distal end surface of the protruding section put in contact with the first metal member.

Since each above joining method performs the fiction stir with only the stirring pin in contact with the first and second metal members, the joining method is capable of: reducing load on the first and second metal members; and preventing the flow of the plastic fluid material out of the butt sections. In addition, since the joining method performs the friction stir with only the stirring pin in contact with the first and second metal members, the joining method is capable of reducing the thicknesses and weights of the respective first and second metal members. Furthermore, because of the deep insertion of the distal end surface of the protruding section beyond the lap section, the joining method is capable of securely joining portions around the lap section. Moreover, since the rotary tool includes the flat surface, the joining method is capable of: inhibiting the plastic fluid material from stirring up around the protruding section; and thereby securely shattering an oxide film of the lap section.

Advantageous Effects of Invention

The joining methods according to the present invention are capable of: preventing the flow of the plastic fluid material out of the butt sections; and reducing the thicknesses and weights of the respective metal members.

DESCRIPTION OF EMBODIMENTS

First Embodiment

Figure 1:
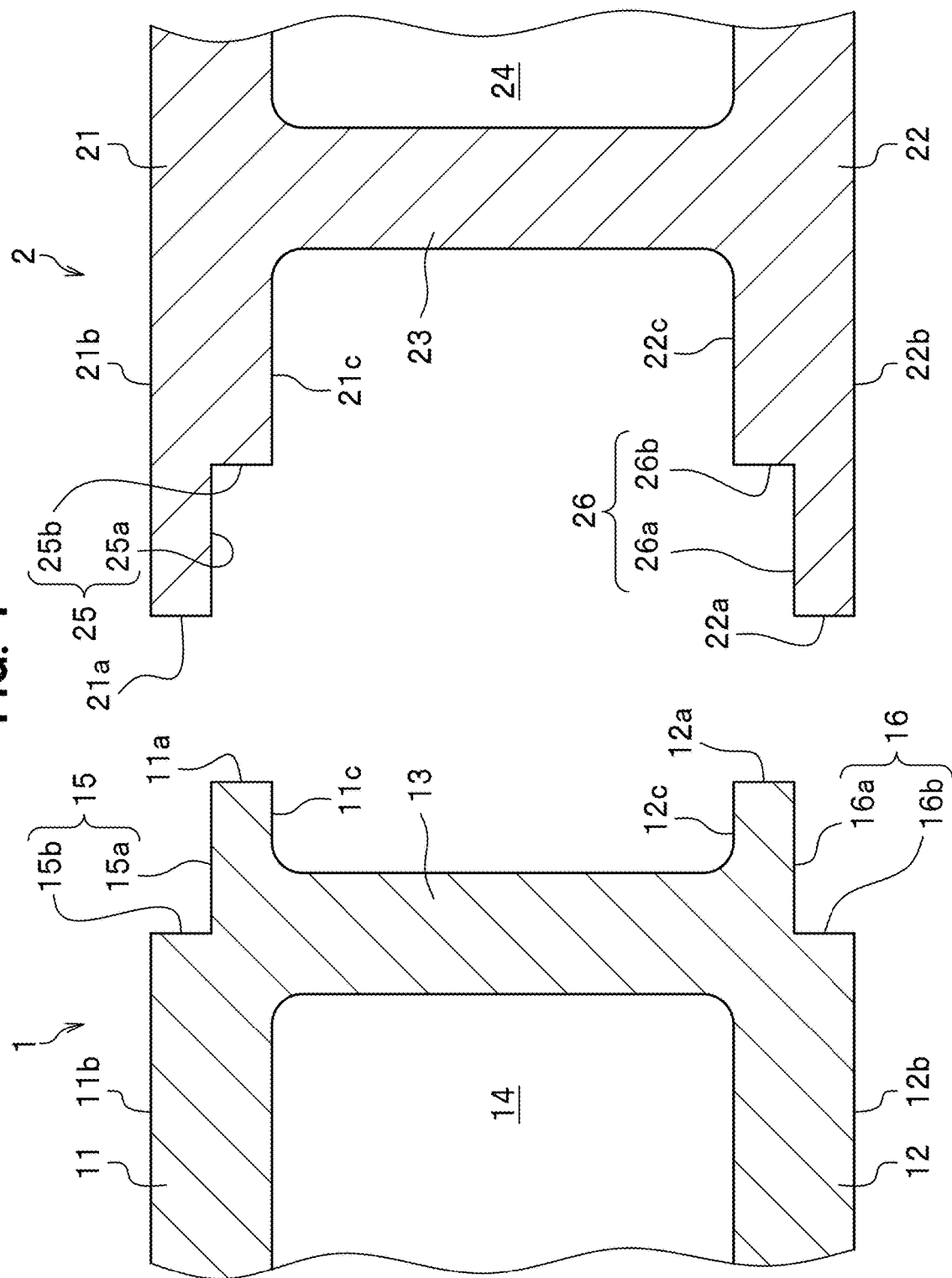
FIG. 1 is a cross-sectional diagram illustrating a preparation step in a joining method according a first embodiment of the present invention.

Hereinafter, a joining method according to an embodiment of the present invention will be described in detail using the accompanying drawings. As illustrated in FIG. 1, the joining method according to the embodiment welds a first metal member 1 as a double-skin member and a second metal member 2 as a double-skin member by friction stir. In the following descriptions, a "front surface" means a surface opposite to a "back surface."

The first and second metal members 1, 2 are each made of a friction-stirrable metal. The material of the first and second metal members 1, 2 is selected depending on the necessity from friction-stirrable metals such as aluminum, aluminum alloys, copper, copper alloys, titanium, titanium alloys, magnesium and magnesium alloys. The joining method according to the embodiment performs a preparation step, a superposition butting step, and a friction stirring step.

The preparation step is a step of preparing the first metal member 1 and the second metal member 2. The first metal member 1 mainly includes an upper base plate 11, a lower base plate 12, and a support plate 13. The first metal member 1 is, for example, an extrusion-formed member. A first upper step section 15 is formed in a front surface 11b of an end portion of the upper base plate 11. The first upper step section 15 includes a first upper step bottom surface (first step bottom surface) 15a, and a first upper step side surface (first step side surface) 15b. The first upper step bottom surface 15a and the first upper step side surface 15b are vertical to each other. A hollow section 14 is formed between the upper base plate 11 and the lower base plate 12.

A first lower step section 16 is formed in a front surface 12b of an end portion of the lower base plate 12. The first lower step section 16 includes a first lower step bottom surface (first step bottom surface) 16a, and a first lower step side surface (first step side surface) 16b. The first lower step bottom surface 16a and the first lower step side surface 16b are vertical to each other. The support plate 13 is a plate-shaped member connecting a back surface 11c of the upper base plate 11 and a back surface 12c of the lower base plate 12 such that the back surfaces 11c, 12c are vertical to the support plate 13. A corner portion between the upper base plate 11 and the support plate 13 is formed in an arc shape. A corner portion between the lower base plate 12 and the support plate 13 is also formed in an arc shape.

The second metal member 2 mainly includes an upper base plate 21, a lower base plate 22, and a support plate 23. The second metal member 2 is, for example, an extrusion-formed member. A second upper step section 25 is formed in a back surface 21c of an end portion of the upper base plate 21. The second upper step section 25 includes a second upper step bottom surface (second step bottom surface) 25a, and a second upper step side surface (second step side surface) 25b. The second upper step bottom surface 25a and the second upper step side surface 25b are vertical to each other. A hollow section 24 is formed between the upper base plate 21 and the lower base plate 22.

A second lower step section 26 is formed in a back surface 22c of an end portion of the lower base plate 22. The second lower step section 26 includes a second lower step bottom surface (second step bottom surface) 26a, and a second lower step side surface (second step side surface) 26b. The second lower step bottom surface 26a and the second lower step side surface 26b are vertical to each other. The support plate 23 is a plate-shaped member connecting a back surface 21c of the upper base plate 21 and a back surface 22c of the lower base plate 22 such that the back surfaces 21c, 22c are vertical to the support plate 23. A corner portion between the upper base plate 21 and the support plate 23 is formed in an arc shape. A corner portion between the lower base plate 22 and the support plate 23 is also formed in an arc shape.

Figure 2:
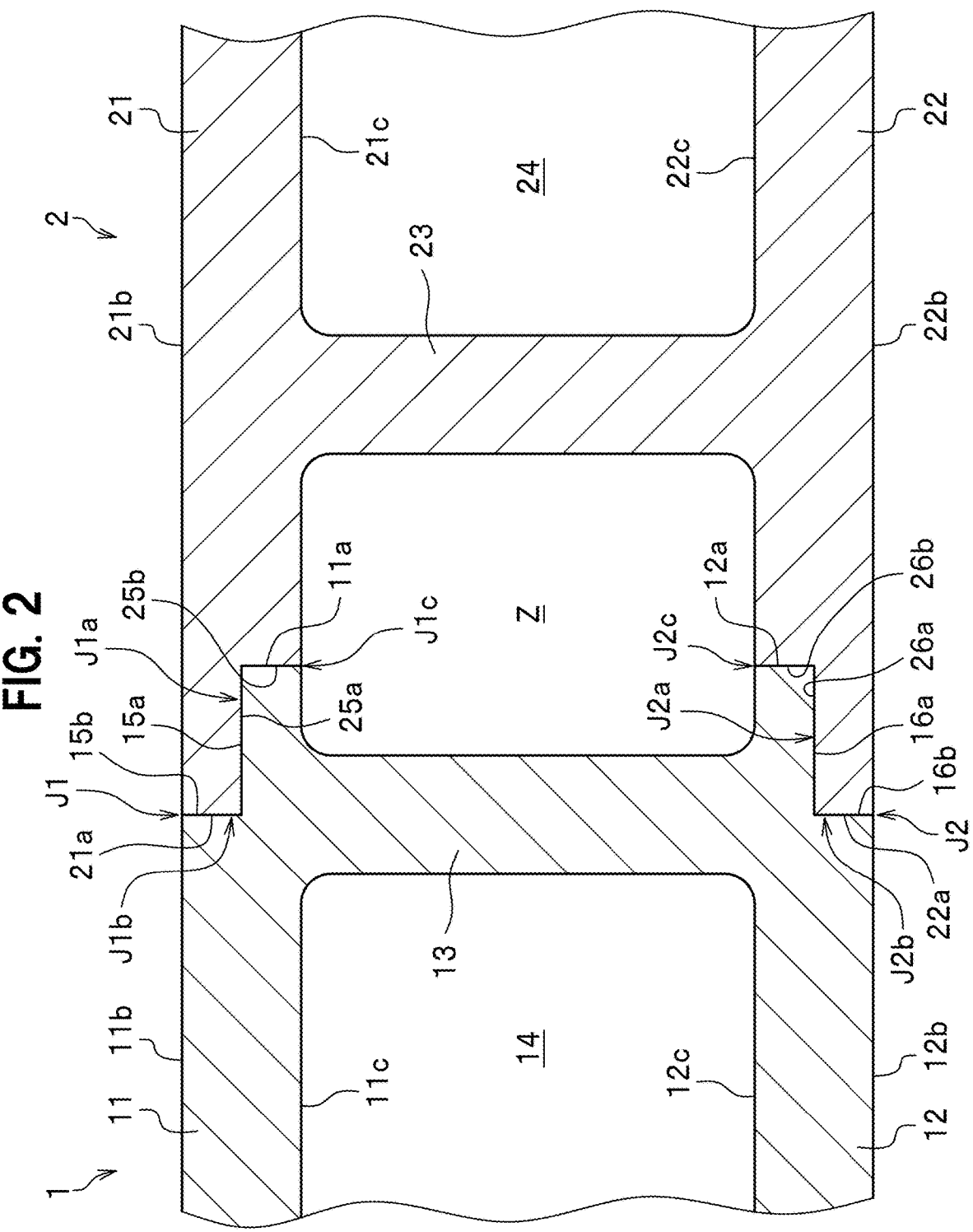
FIG. 2 is a cross-sectional diagram illustrating a superposition butting step in the joining method according the first embodiment.

As illustrated in FIG. 2, the superposition butting step is a step of forming butt sections J1, J2 by butting the end portions of the first metal member 1 and the end portions of the second metal member 2. The butt section J1 includes an upper lap section (lap section) J1a, an upper front-side butt section J1b, and an upper back-side butt section J1c. The upper lap section J1a is formed by stacking the first upper step bottom surface 15a and the second upper step bottom surface 25a together.

The upper front-side butt section J1b is formed by butting the first upper step side surface 15b and an end surface 21a of the upper base plate 21 together. The upper back-side butt section J1c is formed by butting an end surface 11a of the upper base plate 11 and the second upper step side surface 25b together.

The butt section J2 includes a lower lap section (lap section) J2a, a lower front-side butt section J2b, and a lower back-side butt section J2c. The lower lap section J2a is formed by stacking the first lower step bottom surface 16a and the second lower step bottom surface 26a together. The lower front-side butt section J2b is formed by butting the first lower step side surface 16b and an end surface 22a of the lower base plate 22 together. The lower back-side butt section J2c is formed by butting an end surface 12a of the lower base plate 12 and the second lower step side surface 26b together. Since the first metal member 1 and the second metal member 2 are thus butted together such that the butt sections J1, J2 are shaped like a crank in their cross-sectional view, misalignment between the first metal member 1 and the second metal member 2 can be prevented in the friction stirring step.

Figure 3:
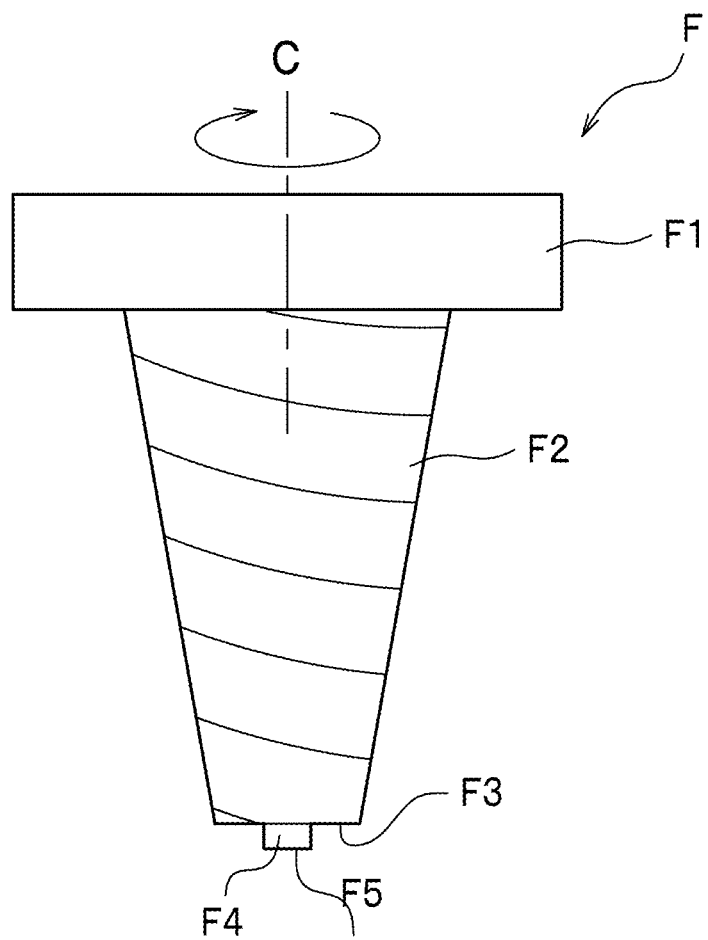
FIG. 3 is a side diagram illustrating a rotary tool.
Figure 4:
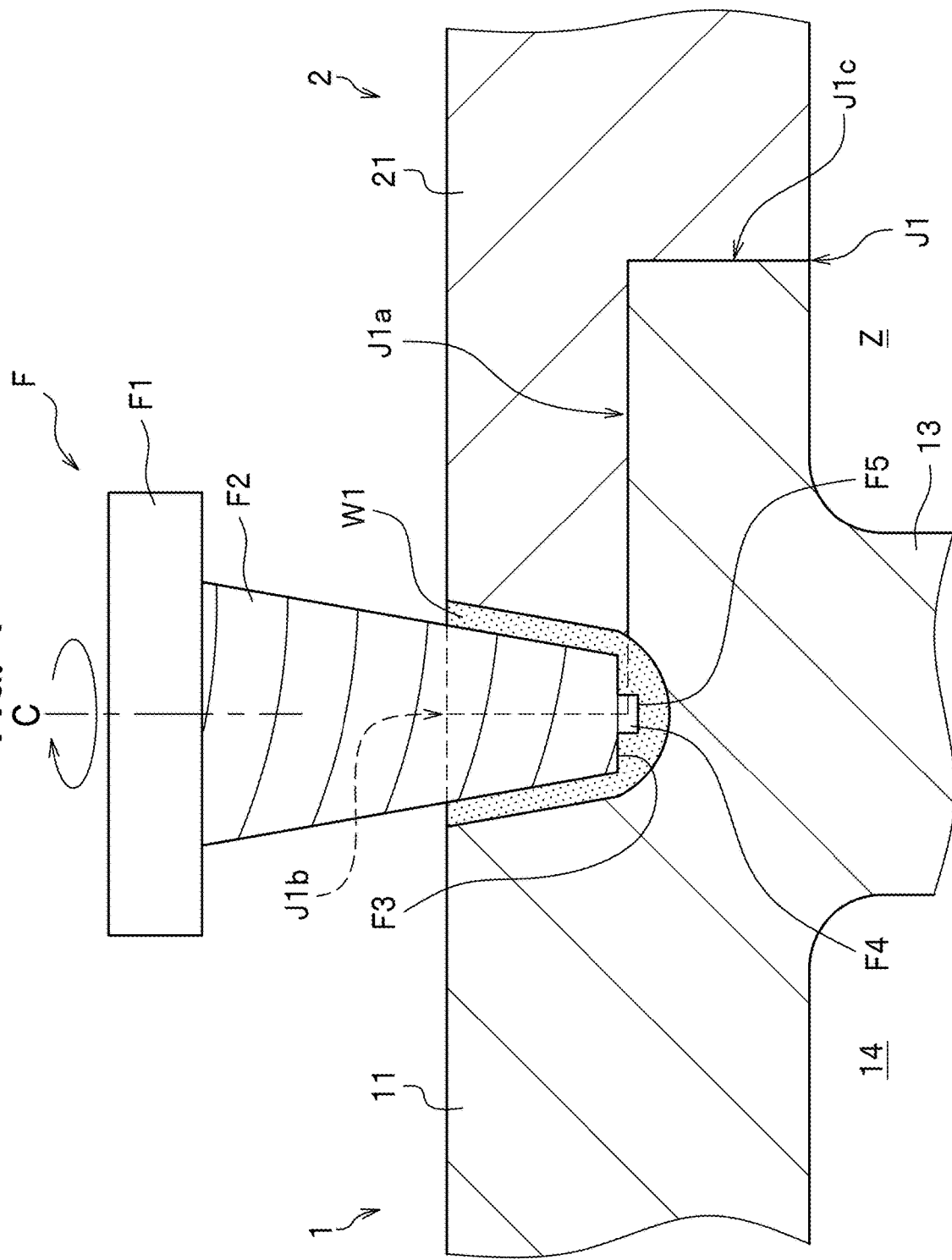
FIG. 4 is a cross-sectional diagram illustrating an upper front-side friction stirring step in the joining method according to the first embodiment.

As illustrated in FIGS. 3 and 4, the friction stirring step is a step of performing friction-stir welding on the butt sections J1, J2 using a rotary tool F. As illustrated in FIG. 3, the rotary tool F includes a connecting section F1, and a stirring pin F2. A protruding section F4 is formed in a distal end of the stirring pin F2. The rotary tool F is made of, for example, a tool steel. The connecting section F1 is a part to be connected to a rotary shaft of a friction-stirring apparatus (not illustrated). The connecting section F1 is formed in a columnar shape, and includes a screw hole (not illustrated) to which to fasten a bolt.

The stirring pin F2 is vertically attached to the connecting section F1, and is coaxial with the connecting part F1. The stirring pin F2 becomes gradually narrower as it becomes farther from the connecting part F1. A flat surface F3 is formed in the distal end of the stirring pin F2. The flat surface F3 is vertical to a rotation axis C, and is flat.

A spiral groove is cut in the outer peripheral surface of the stirring pin F2. In the embodiments, for the purpose of turning the rotary tool F clockwise, the spiral groove is formed counterclockwise from its base to distal end. In other words, the tracing of the spiral groove from its base to distal end shows that the spiral groove is formed counterclockwise in its view from above.

It should be noted that for the purpose of turning the rotary tool F counterclockwise, it is preferable that the spiral groove be formed clockwise from its base to distal end. In other words, the tracing of the spiral groove of this case from its base to distal end shows that the spiral groove is formed clockwise in its view from above. In the case where the spiral groove is set like this, the spiral groove guides plastically fluidized metal toward the distal end of the stirring pin F2 during the friction stir. This makes it possible to reduce an amount of metal to overflow to the outside of the welded metal members (the first metal member 1 and the second metal member 2).

The protruding section F4 is projectingly provided to the center of the flat surface F3 coaxially with the connecting section F1. The shape of the protruding section F4 is limited to a specific one. In this embodiment, however, its shape is columnar. A spiral groove may be formed in the side surface of the protruding section F4.

The friction stirring step according to this embodiment performs an upper front-side friction stirring step, an upper back-side friction stirring step, a lower front-side friction stirring step, and a lower back-side friction stirring step.

As illustrated in FIG. 4, in the upper front-side friction stirring step, the rotary tool F, as turned clockwise, is inserted into the upper front-side butt section J1b, and is relatively moved along the upper front-side butt section Jib. In FIG. 4, the rotary tool F is moved from here to over there. The depth at which the rotary tool F is inserted may be set depending on the necessity. In this embodiment, the depth is set such that a distal end surface F5 of the protruding section F4 goes deep beyond the upper lap section J1a with the flat surface F3 kept in contact with both the first metal member 1 and the second metal member 2. That is to say, the depth is set such that the distal end surface F5 of the protruding section F4 comes into contact with only the first metal member 1. In other words, the depth at which the rotary tool F is inserted is set such that the upper lap section J1a is located at the side surface of the protruding section F4. A plasticized area W1 is formed in the movement track of the rotary tool F.

Figure 5:
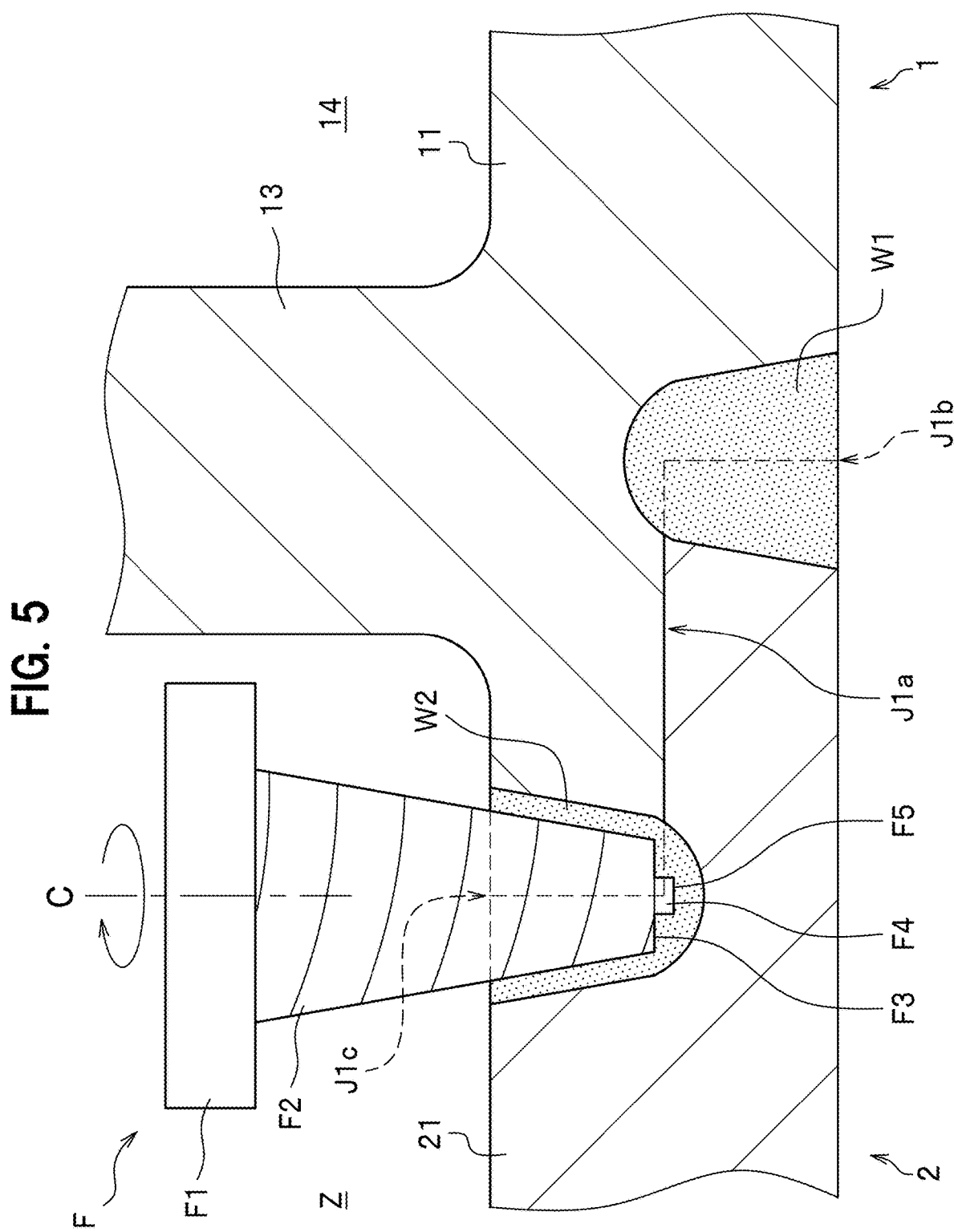
FIG. 5 is a cross-sectional diagram illustrating an upper back-side friction stirring step in the joining method according to the first embodiment.

As illustrated in FIG. 5, in the upper back-side friction stirring step, the rotary tool F, as turned clockwise, is inserted into the upper back-side butt section Pc, and is relatively moved along the upper back-side butt section J1c. In FIG. 5, the rotary tool F is moved from here to over there. The depth at which the rotary tool F is inserted may be set depending on the necessity. In this embodiment, the depth is set such that the distal end surface F5 of the protruding section F4 goes deep beyond the upper lap section J1a with the flat surface F3 kept in contact with both the first metal member 1 and the second metal member 2. That is to say, the depth is set such that the distal end surface F5 of the protruding section F4 comes into contact with only the second metal member 2. In other words, the depth at which the rotary tool F is inserted is set such that the upper lap section J1a is located at the side surface of the protruding section F4. A plasticized area W2 is formed in the movement track of the rotary tool F. Incidentally, the rotary tool F may be attached to an arm robot equipped with a rotational drive means, such as a spindle unit, in a distal end of the arm robot. This arrangement makes it possible to perform the work in a narrow space, such as in the hollow section Z.

As illustrated in FIG. 4, in the lower front-side friction stirring step, the rotary tool F, as turned clockwise, is inserted into the lower front-side butt section J2b, and is relatively moved along the lower front-side butt section J2b. The lower front-side friction stirring step is performed in the same way as the upper front-side friction stirring step is, and detailed descriptions for it will be omitted.

As illustrated in FIG. 5, in the lower back-side friction stirring step, the rotary tool F, as turned clockwise, is inserted into the lower back-side butt section J2c, and is relatively moved along the lower back-side butt section J2c. The lower back-side friction stirring step is performed in the same way as the upper back-side friction stirring step is, and detailed descriptions for it will be omitted. Through the above steps, the first and second metal members 1, 2 are welded together. Furthermore, a burr removing step of removing burr produced in the friction stirring step may be performed.

Since the above-discussed joining method according to the embodiment performs the fiction stir with only the stirring pin F2 put in contact with the first and second metal members 1, 2, the joining method is capable of: reducing load on the first and second metal members 1, 2; and preventing the flow of the plastic fluid material out of the butt section J1. Specifically, the joining method is capable of preventing the flow of the plastic fluid material out of the upper back-side butt section J1c while performing the upper front-side friction stirring step.

In addition, since the joining method reduces the load on the first and second metal members 1, 2 while performing the friction stirring step, the joining method is capable of reducing the thicknesses and weights of the respective first and second metal members 1, 2. Specifically, the joining method is capable of reducing the plate thicknesses of the upper base plates 11, 21, the lower base plates 12, 22, and the support plates 13, 23. In addition, the joining method is capable of: reducing the widths of the plasticized areas W1, W2; and accordingly reducing the widths of the upper and lower lap sections J1a, J2a.

Furthermore, since the joining method inserts the distal end surface F5 of the protruding section F4 deep beyond the upper and lower lap sections J1a, J2a while performing the friction stirring step, the joining method is capable of securely joining the portions around the upper and lower lap sections J1a, J2a. For example, while performing the upper front-side friction stirring step, the joining method is capable of: welding both the upper lap section J1a and the upper front-side butt section J1b by friction stir; and accordingly increasing the joining strength. Moreover, since the rotary tool F includes the flat surface F3, the joining method is capable of: inhibiting the plastic fluid material from stirring up around the protruding section F4 using the flat surface F3; and thereby securely shattering an oxide film of the upper lap section J1a.

Although in the friction stirring step according to the first embodiment, the depth at which the rotary tool F is inserted is set as discussed above, the depth at which the rotary tool F is inserted may be set such that the flat surface F3 is located lower than the upper lap section J1a.

Second Embodiment

Figure 6:
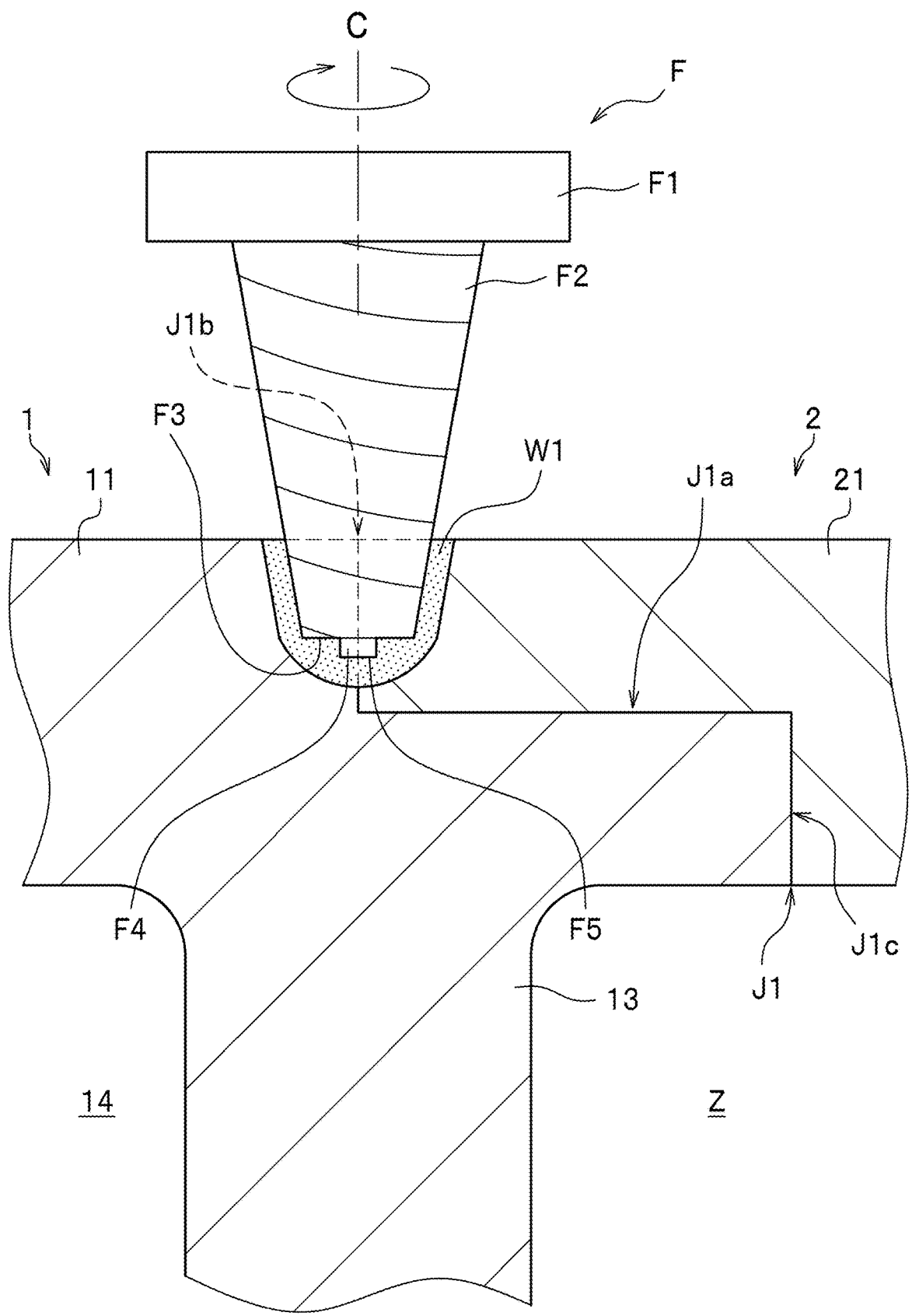
FIG. 6 is a cross-sectional diagram illustrating an upper front-side friction stirring step in a joining method according to a second embodiment.

Next, using FIG. 6, descriptions will be provided for a joining method according to a second embodiment of the present invention. The joining method according to the embodiment performs the preparation step, the superposition butting step, and the friction stirring step. The second embodiment is different from the first embodiment in terms of the depth at which the rotary tool F is inserted, and the following descriptions will be provided by focusing on what makes the second embodiment different from the first embodiment.

As illustrated in FIG. 6, in the upper front-side friction stirring step, the rotary tool F, as turned clockwise, is inserted into the upper front-side butt section J1b, and is relatively moved along the upper front-side butt section Jib. In FIG. 6, the rotary tool F is moved from here to over there. In the second embodiment, the depth at which the rotary tool F is inserted is set such that each of the flat surface F3 and the distal end surface F5 of the protruding section F4 come into contact with both of the first and second metal members 1, 2. Specifically, the depth is set such that the distal end surface F5 of the protruding section F4 is not allowed to come into contact with the upper lap section J1a.

Since the above-discussed joining method according to the second embodiment performs the fiction stir with only the stirring pin F2 put in contact with the first and second metal members 1, 2, the joining method is capable of: reducing load on the first and second metal members 1, 2; and preventing the flow of the plastic fluid material out of the butt section J1. Specifically, the joining method is capable of preventing the flow of the plastic fluid material out of the upper back-side butt section Pc while performing the upper front-side friction stirring step.

In addition, since the joining method reduces the load on the first and second metal members 1, 2 while performing the friction stirring step, the joining method is capable of reducing the thicknesses and weights of the respective first and second metal members 1, 2. Moreover, since the rotary tool F includes the flat surface F3, the joining method is capable of: inhibiting the plastic fluid material from stirring up around the protruding section F4 using the flat surface F3; and thereby securely shattering an oxide film of the upper lap section Jib.

Third Embodiment

Figure 7:
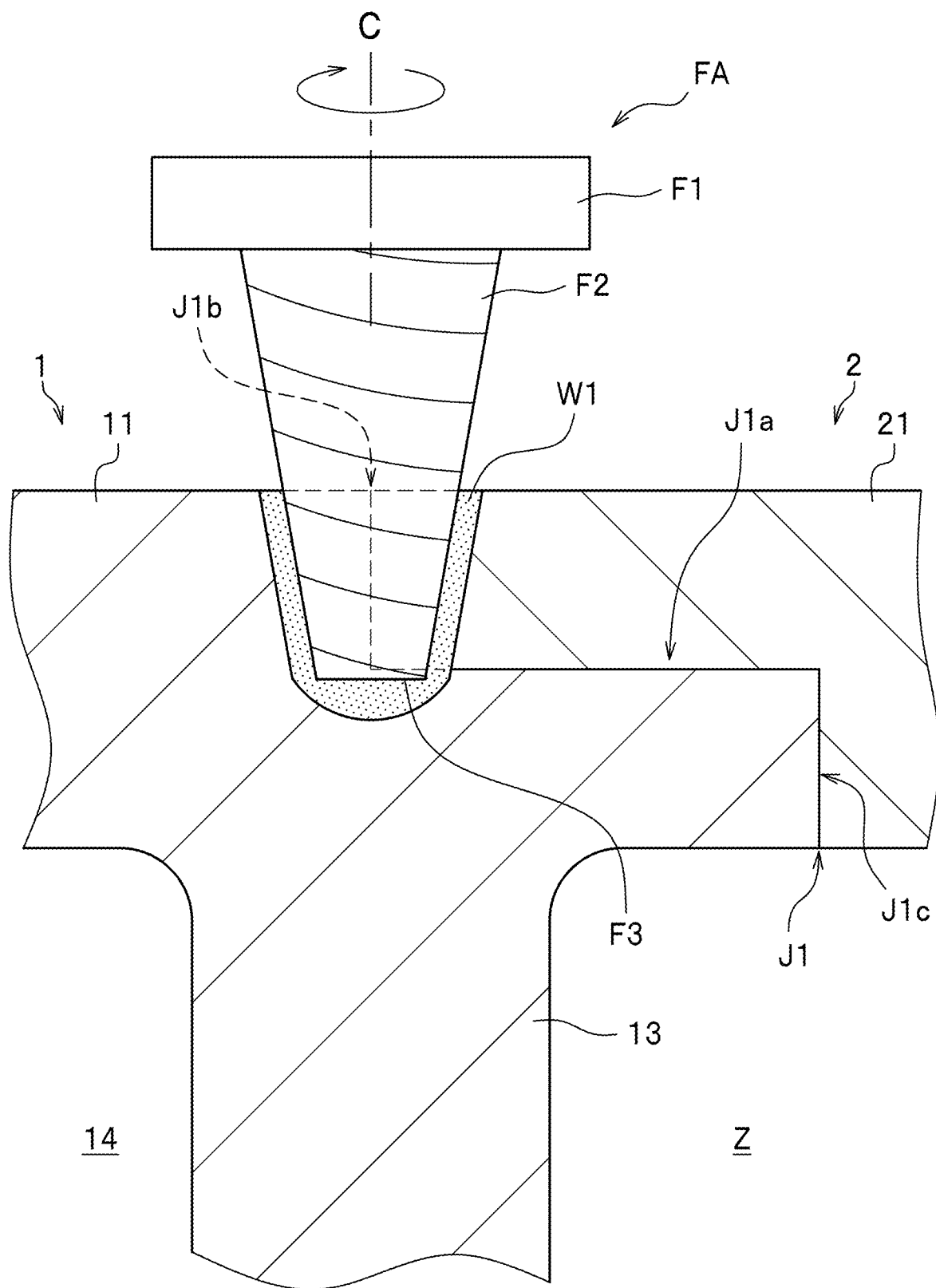
FIG. 7 is a cross-sectional diagram illustrating an upper front-side friction stirring step in a joining method according to a third embodiment.

Next, using FIG. 7, descriptions will be provided for a joining method according to a third embodiment of the present invention. The joining method according to the embodiment performs the preparation step, the superposition butting step, and the friction stirring step. The joining method according to the third embodiment is different from the joining method according to the first embodiment in terms of the rotary tool, and the following descriptions will be provided by focusing on what makes the third embodiment different from the first embodiment.

As illustrated in FIG. 7, the rotary tool FA according to the third embodiment is different from the rotary tool F used in the first embodiment in that the rotary tool FA is provided with no protruding body. As illustrated in FIG. 7, in the upper front-side friction stirring step according to the embodiment, the depth at which the rotary tool FA is inserted is set such that the flat surface F3 of the rotary tool FA goes deep beyond the upper lap section J1a with the stirring pin F2 kept in contact with the upper base plates 11, 21.

The above-discussed joining method according to the third embodiment can bring about substantially the same effects as the joining method according to the first embodiment.

Fourth Embodiment

Figure 8:
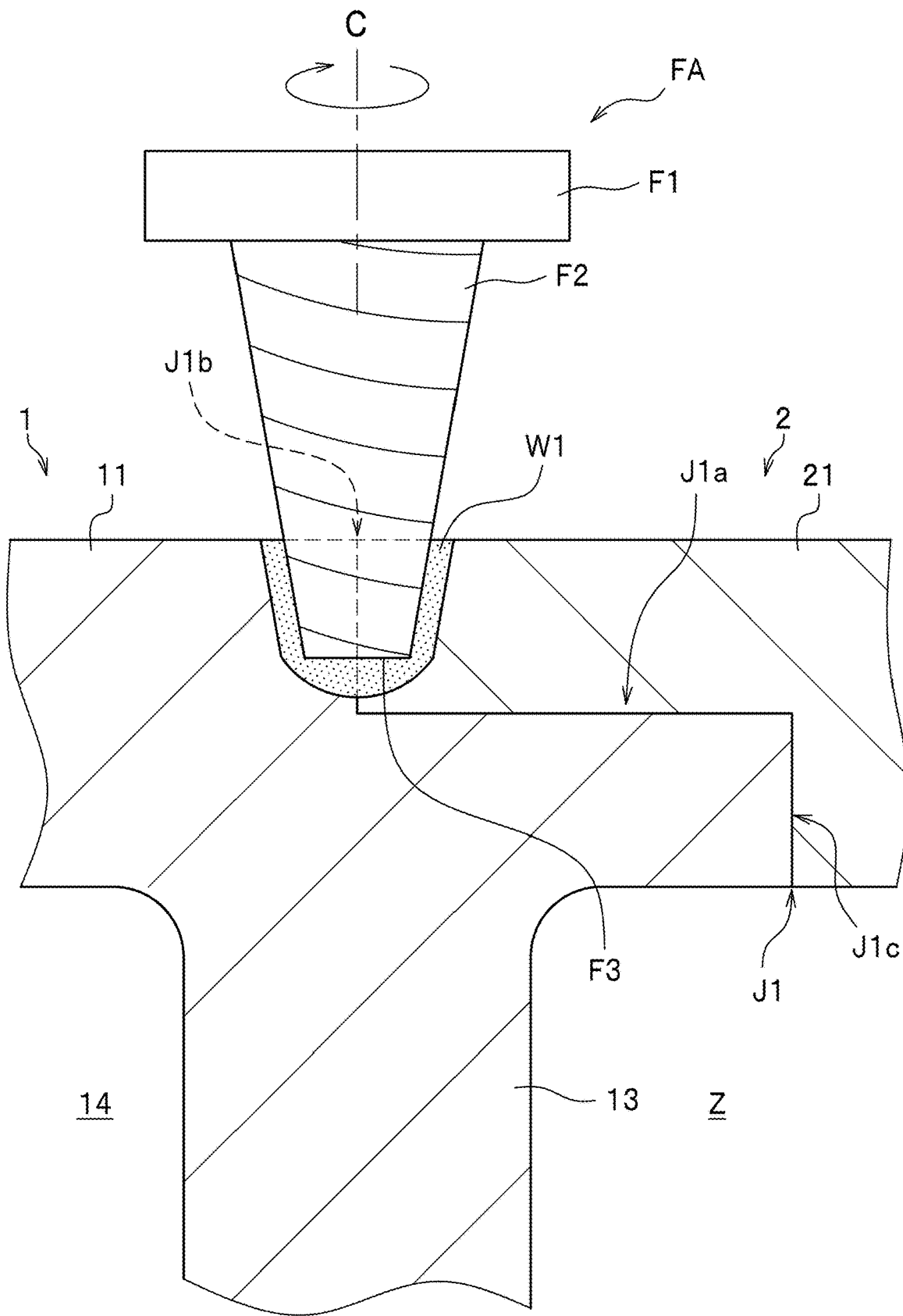
FIG. 8 is a cross-sectional diagram illustrating an upper front-side friction stirring step in a joining method according to a fourth embodiment.

Next, using FIG. 8, descriptions will be provided for a joining method according to a fourth embodiment of the present invention. The joining method according to the fourth embodiment is different from the joining method according to the second embodiment in terms of the rotary tool, and the following descriptions will be provided by focusing on what makes the fourth embodiment different from the second embodiment.

As illustrated in FIG. 8, the rotary tool FA according to the fourth embodiment is different from the rotary tool F used in the second embodiment in that the rotary tool FA is provided with no protruding body. As illustrated in FIG. 8, in the upper front-side friction stirring step according to the embodiment, the depth at which the rotary tool FA is inserted is set such that the flat surface F3 of the rotary tool FA is located higher than the upper lap section J1a with the stirring pin F2 kept in contact with the upper base plates 11, 21.

The above-discussed joining method according to the fourth embodiment can bring about substantially the same effects as the joining method according to the second embodiment.

Fifth Embodiment

Figure 9:
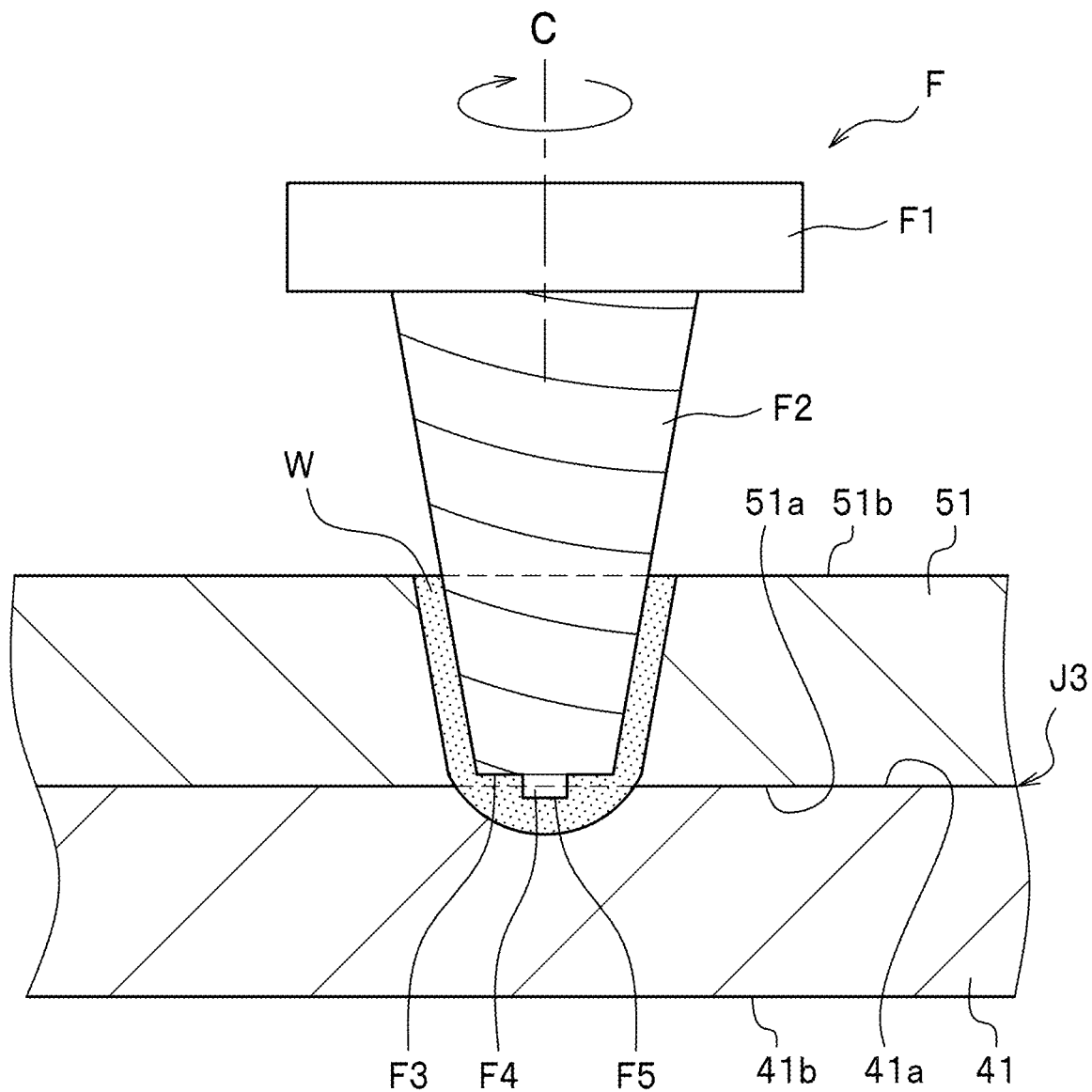
FIG. 9 is a cross-sectional diagram illustrating a friction stirring step in a joining method according to a fifth embodiment.

Next, using FIG. 9, descriptions will be provided for a joining method according to a fifth embodiment of the present invention. The joining method according to the fifth embodiment is different from the joining method according to the first embodiment in that the joining method according to the fifth embodiment uses a plate-shaped first metal member 41 and a plate-shaped second metal member 51. The following descriptions will be provided by focusing on what makes the fifth embodiment different from the first embodiment. The joining method according to the fifth embodiment performs the preparation step, the superposition step, and the friction stirring step.

The preparation step is a step of preparing the first metal member 41 and the second metal member 51. The first and second metal members 41, 51 are plate-shaped friction-stirrable metal members forming part of a double-skin panel.

The superposition step is a step of superposing the second metal member 51 onto the first metal member 41. A lap section J3 is formed by superposing a back surface 51a of the second metal member 51 onto a front surface 41a of the first metal member 41.

The friction stirring step is a step of welding the lap section J3 by friction stir using the rotary tool F. In the friction stirring step, the rotary tool F, as rotating, is inserted from a front surface 51b of the second metal member 51, and the depth at which the rotary tool F is inserted is set such that: the flat surface F3 of the rotary tool F is located above the lap section J3; and the distal end surface F5 of the protruding section F4 is located under the lap section J3. That is to say, the depth at which the rotary tool F is inserted is set such that the lap section J3 is located at the side surface of the protruding section F4.

Since the above-discussed joining method according to the embodiment performs the fiction stir with only the stirring pin F2 put in contact with the first and second metal members 41, 51, the joining method is capable of: reducing load on the first and second metal members 41, 51; and preventing the flow of the plastic fluid material out of the lap section J3.

In addition, since the joining method reduces the load on the first and second metal members 41, 51 while performing the friction stirring step, the joining method is capable of reducing the thicknesses and weights of the respective first and second metal members 41, 51. Furthermore, since the joining method inserts the distal end surface F5 of the protruding section F4 deep beyond the lap section J3 while performing the friction stirring step, the joining method is capable of: securely joining the portions around the lap section J3; and thereby increasing the joining strength. Moreover, since the rotary tool F includes the flat surface F3, the joining method is capable of: inhibiting the plastic fluid material from stirring up around the protruding section F4 using the flat surface F3; and securely shattering an oxide film of the lap section J3.

It should be noted that the depth at which the rotary tool F is inserted may be set such that the distal end surface F5 of the protruding section F4 is located above the lap section J3. That is to say, the depth at which the rotary tool F is inserted may be set such that the stirring pin F2 comes into contact with only the second metal member 51. In this case, the lap section J3 is plastically fluidized and welded by heat produced by friction between the rotary tool F and the second metal member 51. Incidentally, in the friction stirring step, the flat surface F3 of the rotary tool F may be inserted deep beyond the lap section J3.

In addition, in the friction stirring step according to the embodiment, the friction-stir welding may be performed on the lap section J3 by inserting the rotary tool F from the back surface 41b of the first metal member 41. In this case, the plasticized area W1 on the front side and the plasticized area on the back side may be formed to cover each other.

EXAMPLES

Figure 10:
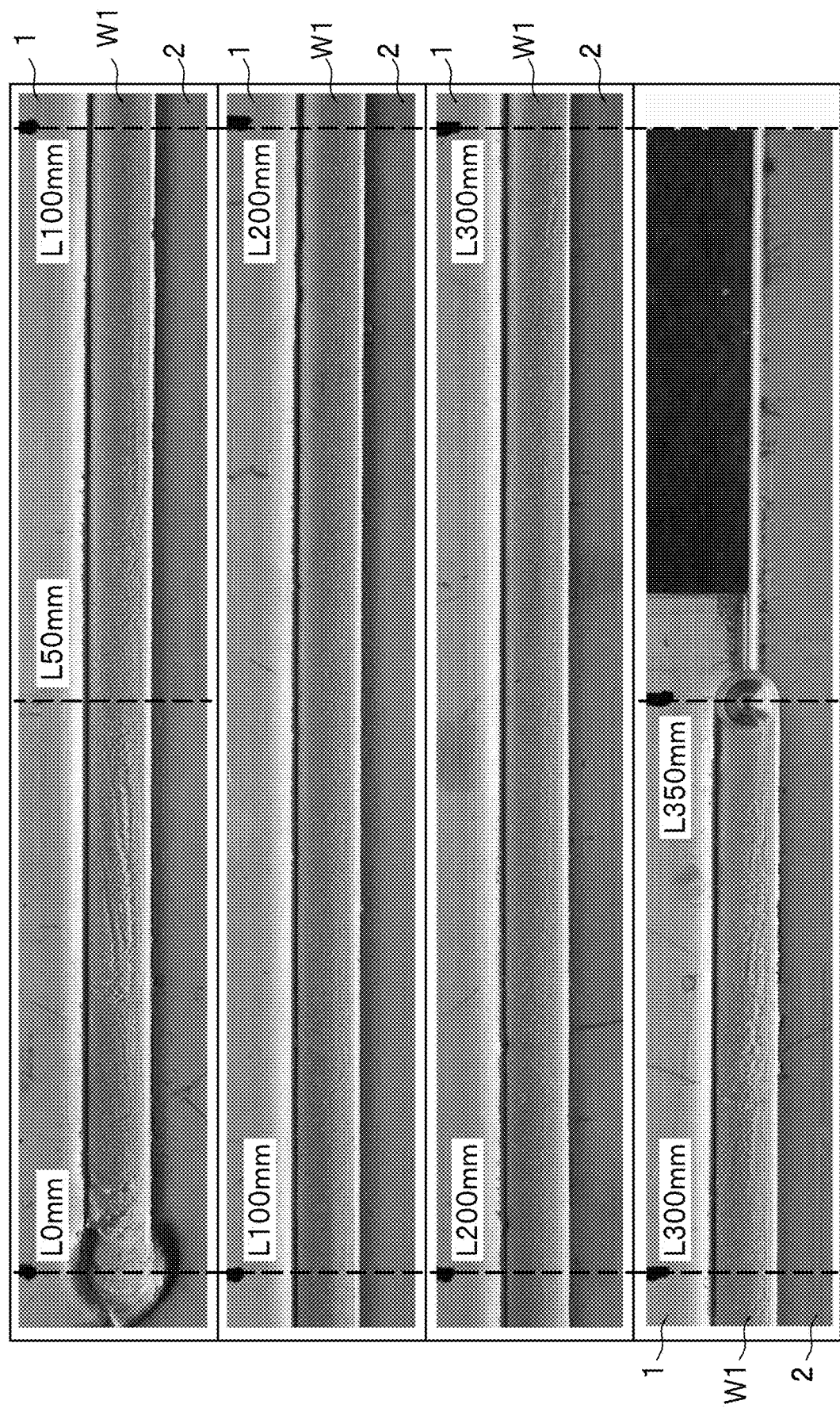
FIG. 10 is a plan view showing a first test according to an example.
Figure 11:
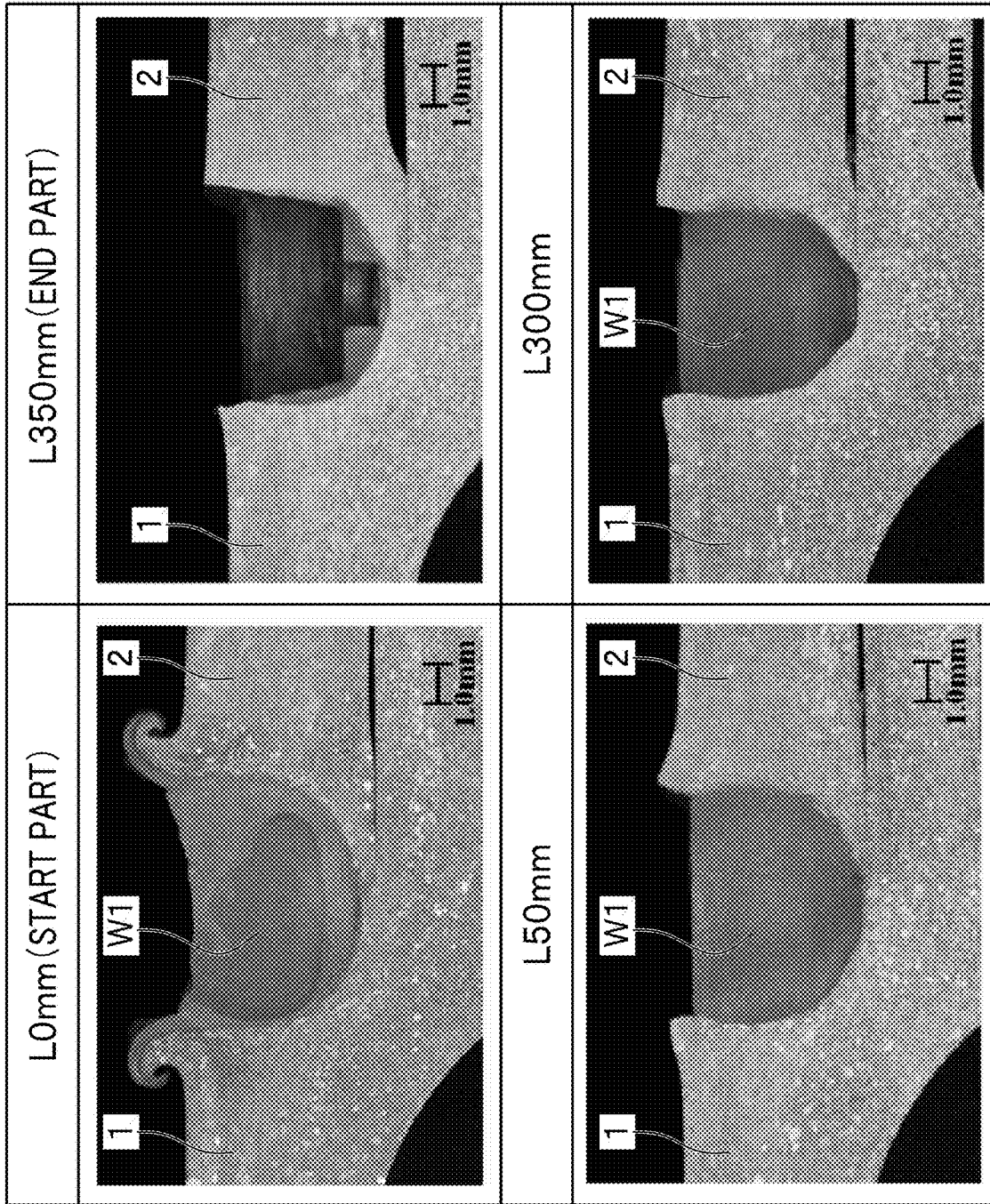
FIG. 11 is a cross-sectional view showing the first test according the example.

Next, descriptions will be provided for examples of the present invention. A first test and a second test were carried out for the examples. In the first test, as shown in FIG. 10, a friction-stir welding was continuously performed from a start section (L0 mm) to an end section (L350 mm). Metal members in the first test were butted together in the same way as those were butted together in the first embodiment. In the first test, the number of revolutions of the rotary tool F was set at 3000 rpm, and the movement speed of the rotary tool F was set at 300 mm/min. In the first test, the depth at which the rotary tool F was inserted was set such as the distal end surface F5 of the protrusion section F4 was located higher than the lap section (upper lap section), like in the second embodiment. FIG. 11 shows macro cross-sectional views respectively at positions of L0 mm, L50 mm, L300 mm and L350 mm shown in FIG. 10. As shown in FIG. 11, the first test confirmed that the joining condition was excellent at all the positions.

Figure 12:
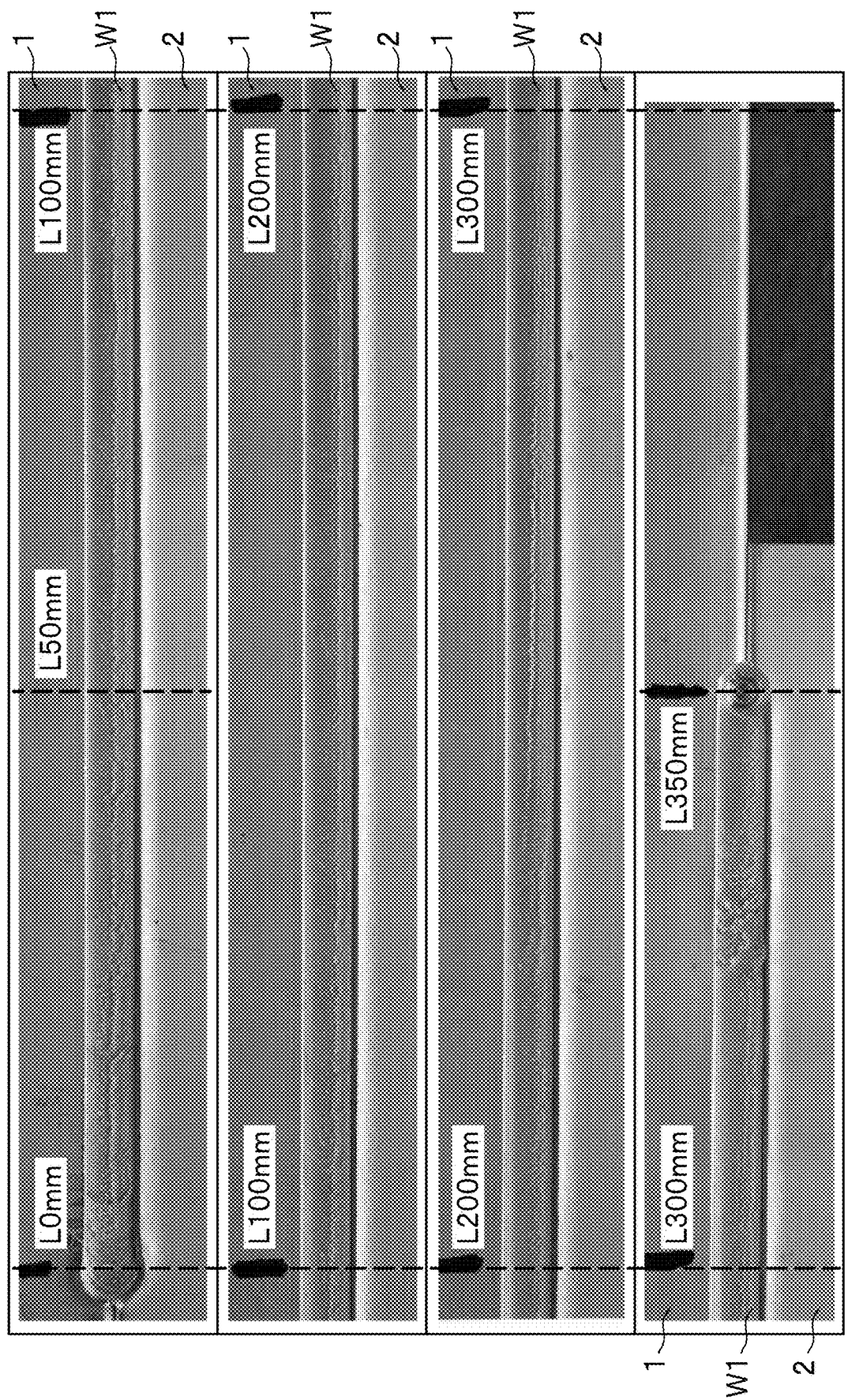
FIG. 12 is a plan view showing a second test according to another example.
Figure 13:
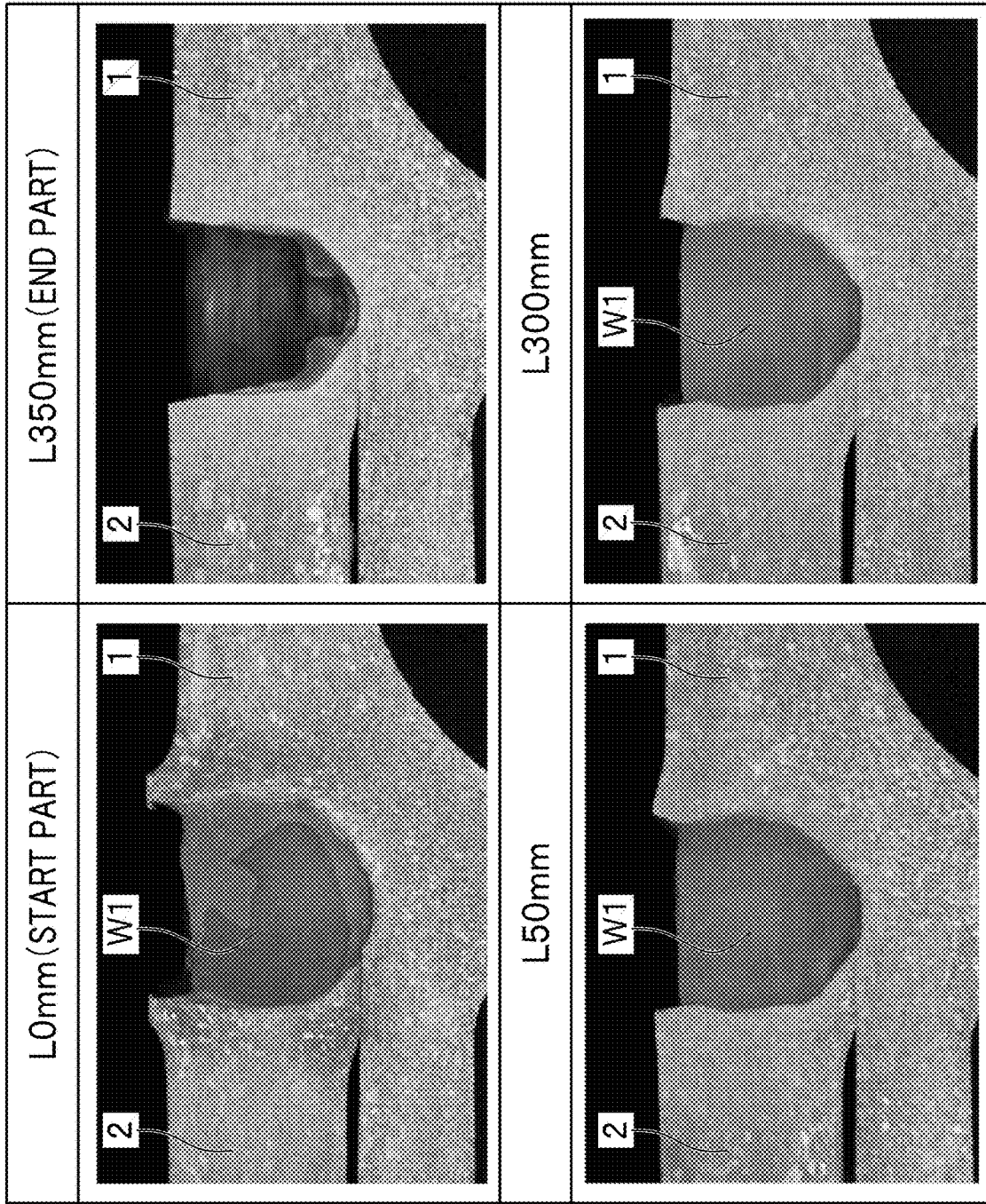
FIG. 13 is a cross-sectional view showing the second test according to the example.
Figure 14:
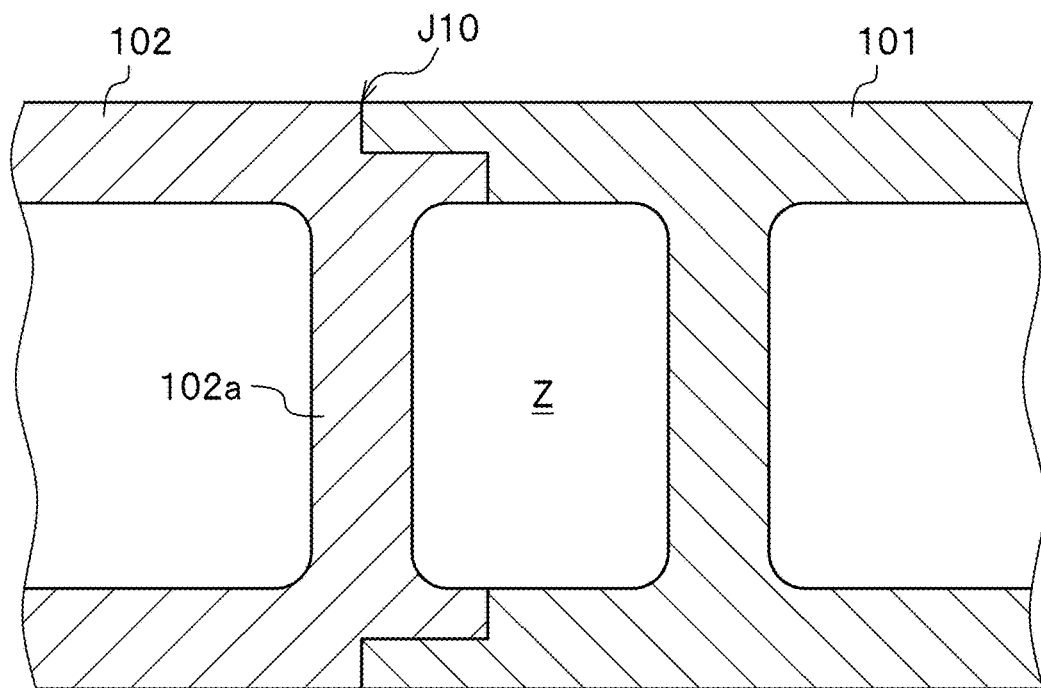
FIG. 14 is a cross-sectional diagram illustrating a butting step in a conventional joining method.
Figure 15:
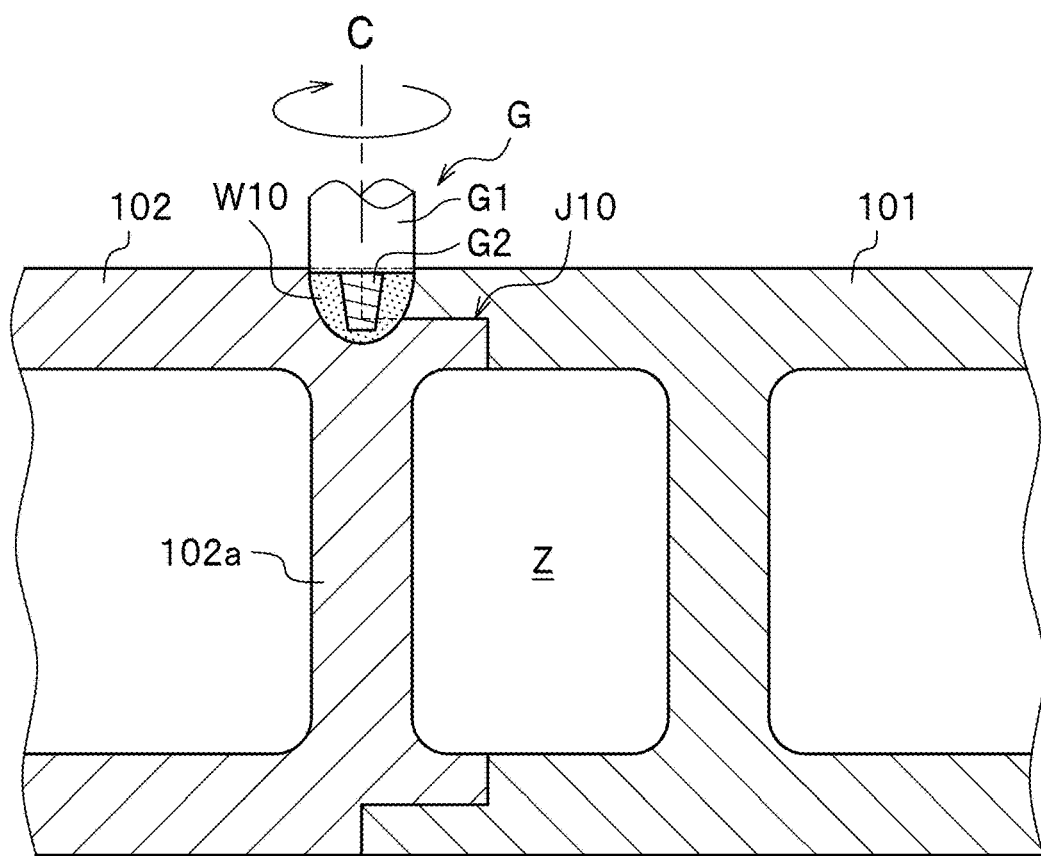
FIG. 15 is a cross-sectional diagram illustrating a friction stirring step in the conventional joining method.

In the second test, as shown in FIG. 12, a friction-stir welding was continuously performed from a start section (L0 mm) to an end section (L350 mm). Metal members in the second test were butted together in the same way as those were butted together in the second embodiment. In the second test, the number of revolutions of the rotary tool F was set at 3500 rpm, and the movement speed of the rotary tool F was set at 300 mm/min. In the second test, the depth at which the rotary tool F was inserted was set such as the distal end surface F5 of the protrusion section F4 was located higher than the lap section (upper lap section), like in the second embodiment. FIG. 13 shows macro cross-sectional views respectively at positions of L0 mm, L50 mm, L300 mm and L350 mm shown in FIG. 12. As shown in FIG. 13, the second test confirmed that the joining condition was excellent at all the positions.

REFERENCE SIGNS LIST 1 first metal member
2 second metal member
F rotary tool
F1 connecting section
F2 stirring pin
F3 flat surface
F4 protruding section
F5 distal end surface
J1 butt section
J1a upper lap section
J1b upper front-side butt section
J1c upper back-side butt section
J2 butt section
J2a lower lap section
J2b lower front-side butt section
J2c lower back-side butt section
W1 plasticized area

The invention claimed is:

1. A joining method of welding a first metal member and a second metal member using a rotary tool with a stirring pin, comprising:
   a preparation step of forming a first step bottom surface and a first step side surface in a front surface of an end portion of the first metal member, and forming a second step bottom surface and a second step side surface in a back surface of an end portion of the second metal member;
   a superposition butting step of forming a lap section by stacking the first step bottom surface and the second step bottom surface together, forming a front-side butt section by butting the first step side surface and an end surface of the second metal member together, and forming a back-side butt section by butting the second step side surface and an end surface of the first metal member together; and
   a friction stirring step of welding the back-side butt section and the lap section by inserting the stirring pin, as rotating, from the back-side butt section, and by relatively moving the rotary tool along the back-side butt section with only the stirring pin put in contact with the first metal member and the second metal member, wherein
   the stirring pin includes a flat surface normal to an axis of rotation of the rotary tool, and a protruding section projecting from the flat surface, and
   in the friction stirring step, the back-side butt section and the lap section are welded with the flat surface inserted into the first metal member and the second metal member, and with a distal end surface of the protruding section inserted deep beyond the lap section and the lap section is located at a same depth as a depth at which an outer peripheral side surface of the protruding section is positioned.

* * * * *